(12) United States Patent
Garibay et al.

(10) Patent No.: US 10,331,605 B2
(45) Date of Patent: Jun. 25, 2019

(54) DYNAMIC RE-ALLOCATION OF SIGNAL LANES

(71) Applicant: International Business Machines Corporation, Armonk, NY (US)

(72) Inventors: Victor A. Garibay, Leander, TX (US); Daniel E. Hurlimann, Austin, TX (US); Chetan Mehta, Austin, TX (US); Fernando Pizzano, Poughkeepsie, NY (US); Thomas R. Sand, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 340 days.

(21) Appl. No.: 15/251,097

(22) Filed: Aug. 30, 2016

(65) Prior Publication Data

US 2018/0060266 A1  Mar. 1, 2018

(51) Int. Cl.
*G06F 13/40* (2006.01)
*G06F 13/42* (2006.01)

(52) U.S. Cl.
CPC ...... *G06F 13/4081* (2013.01); *G06F 13/4022* (2013.01); *G06F 13/4282* (2013.01)

(58) Field of Classification Search
None
See application file for complete search history.

(56) References Cited

U.S. PATENT DOCUMENTS 6,665,742 B2 * 12/2003 Owen ............... H04L 29/06
710/10
7,099,969 B2 * 8/2006 McAfee ............ G06F 13/4022
710/107
7,356,636 B2   4/2008 Torudbakken et al.
7,447,824 B2  11/2008 Jabori et al.
7,480,757 B2   1/2009 Atherton et al.
(Continued)

FOREIGN PATENT DOCUMENTS

CN   103729042 A   4/2014

OTHER PUBLICATIONS

Garibay et al., "Dynamic Allocation of Computer Bus Lanes", U.S. Appl. No. 14/955,739, filed Dec. 1, 2015.
(Continued)

*Primary Examiner* — Idriss N Alrobaye
*Assistant Examiner* — Dayton Lewis-Taylor
(74) *Attorney, Agent, or Firm* — Jay Wahlquist (57) ABSTRACT

A computer-implemented method determines that a link operation associated with a first link, among the set of interface links in a computing system, has resulted in a first set of signal lanes, included in the first link, becoming unused. The method further includes determining a link configuration and selecting, based on the link configuration, a second link from among the interface links, and determining a second set of signal lanes, from among the unused signal lanes included in the first link, to include in the second link. The signal lanes to include in the second link are based on an attribute associated with the second link. The method further includes dynamically reconfiguring the signal lanes included in the second to set to be included in the lanes in the second link. Some computing systems include a lane routing device connected to signal lanes of links among the interface links.

17 Claims, 4 Drawing Sheets

(56) References Cited

U.S. PATENT DOCUMENTS

| | | |
|---|---|---|
| 7,660,925 B2 | 2/2010 | Larson et al. |
| 8,706,944 B2 | 4/2014 | Song et al. |
| 8,838,865 B2 | 9/2014 | Daniel |
| 8,972,611 B2 | 3/2015 | Galles et al. |
| 9,264,384 B1 | 2/2016 | Sundaresan et al. |
| 2006/0168377 A1 | 7/2006 | Vasudevan et al. |
| 2007/0233928 A1 | 10/2007 | Gough |
| 2013/0246680 A1 | 9/2013 | Elboim |

OTHER PUBLICATIONS

Garibay et al., "Dynamic Re-Allocation of Computer Bus Lanes", U.S. Appl. No. 14/956,373, filed Dec. 1, 2015.
Garibay et al., "Dynamic Re-Allocation of Computer Bus Lanes", U.S. Appl. No. 14/955,805, filed Dec. 1, 2015.
Garibay et al., "Switching Allocation of Computer Bus Lanes", U.S. Appl. No. 14/955,766, filed Dec. 1, 2015.

* cited by examiner

DYNAMIC RE-ALLOCATION OF SIGNAL LANES

BACKGROUND

The present disclosure relates to configuring signal lanes of an interface link, and more specifically, to configuring the signal lanes among a plurality of interface links.

SUMMARY

According to embodiments of the present disclosure, a computer-implement method, system, and computer program product dynamically re-configure signal lanes of an interface link included among a plurality of interface links in a computing system. The method comprises determining that the link operations has resulted in a first set of signal lanes, included in the interface link, becoming unused. The method further comprises determining a link configuration, based on the link operation, in which the link configuration is associated with links among the interface links included in the computing system. A candidate link among the interface links is selected based on the link configuration, and a second set of signal lanes, among the first set of signal lanes, is determined to include in the second link. Determining the second set of signal lanes is based on a link attribute associated with the candidate link. The method also comprises dynamically reconfiguring the signal lanes included in the second set to be included in the second link.

In some embodiments, the the method comprises further determining that the second set of signal lanes comprises fewer signal lanes than are included in the first set of signal lanes. Based on the link configuration, a third link is selected from among the interface links and a third set of signal lanes, among the first set of signal lanes and not included in the second set of signal lanes, is determined to include in the third link. The signal lanes included in the third set of signal lanes are dynamically reconfigured to include in the third link.

A computing system and a computer program product can embody the structures and methods of the disclosure. The computing system includes at least one first processor that can perform methods of the disclosure, and a lane routing device connected to signal lanes included in each of the first and second links. In some embodiments of the system, one or both of the first and second links are associated with at least one second processor.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure (hereinafter, "the disclosure") relate to allocating signal lanes of an interface link between a plurality of interface links. More particular aspects relate to dynamically re-allocating unused lanes included in a first interface link to a second interface link. While the present disclosure is not necessarily limited to such applications, various aspects of the disclosure may be appreciated through a discussion of various examples using this context.

A computer can include interface links that interconnect various hardware devices within the computer or, alternatively, hardware devices in communication with the computer (such as, for example, hardware devices included in another computer). As used herein, "computer" refers to any of a variety of computing devices, or computing systems, that can interconnect hardware devices by means of one or more interface links. Well-known examples of such computers and computing systems include server computers, network routers and/or gateways, deskside or laptop computers, tablet or mobile computing devices, cellular or smart phones, "thin" clients", "thick" clients, computers forming cloud computing environments, and computing devices and/ or systems included in, for example, appliances or vehicles. It will be understood by one of ordinary skill in the art that "computer" can encompass a wide variety of computing devices not limited to the foregoing examples, and within the scope of the disclosure.

"Hardware devices", as used herein, refers to any hardware device that is a component of a computer or, alternatively, or in communication with a computer. Examples of such hardware devices include, but are not limited to, processors (or units within a processor, such as a processor core), co-processors, memories, I/O bridges, I/O adapters, and/or I/O devices. Computers can employ interface links to interconnect hardware devices. For example, an interface link can interconnect a processor within a computer with another processor, or a co-processor. An interface link can interconnect a processor and/or co-processor with a memory. An interface link can interconnect a processor and/or a memory with an I/O adapter or device (e.g., a storage device, a network device, or an I/O adapter connected to such a device). The Peripheral Components Interconnect (PCI) Express (PCI-E) is an industry standard interface link that can be used to interconnect processors and/or memory with I/O adapters or I/O devices, for example. Other example interface links include processor and/or memory interfaces (e.g., HyperTransport, and Quick-Path Interface, or "QPI"), network interfaces (e.g., Ethernet), and/or storage interfaces (e.g., Fiber Channel, Small Computer System Interface (SCSI), and/or Serial AT Attachment (SATA) interfaces). As used herein, "interface link"

and/or "link" refers to any interface link for connecting hardware devices within or in communication with computers, such as (but not limited to) the foregoing examples.

In embodiments of the disclosure (hereinafter, "embodiments"), a link can include one or more signal "lanes". A signal lane (hereinafter, "lane") can convey signals on an interface link between hardware devices. A lane can employ various electrical (e.g., differential voltage) and/or optical (e.g., fiber optic) forms of signaling. A lane can be unidirectional (capable of only transmitting signals), or can be bidirectional (capable of both transmitting and receiving signals). In embodiments, a bidirectional lane can include two unidirectional lanes—an outbound lane and an inbound lane—in which the outbound lane operates to transmit signals to another device connected on the link, and the inbound lane operates to receive signals from the other device connected on that link. A link can include a plurality of lanes, each of which can convey portions of the signals communicated on the link, whether the individual lanes are unidirectional, bidirectional, or a combination of both.

A link comprising a plurality of lanes can order the lanes such that each lane is associated with, or communicates with, for example, a bit position within an ordered set of bits forming a unit of data. For example, an 8-lane link can order the lanes to communicate an 8-bit unit of data (i.e., a byte). A 16-lane link can, for example, order 8 of the lanes to communicate, for example, the low-order byte of an ordered set of two bytes and order the remaining 8 lanes to communicate the high-order byte of the two bytes. The particular number of lanes comprising a link can be referred to as a link "width", and links of a particular type (e.g., PCI-E) can have standardly defined widths, which can include particular maximum link widths. For example, PCI-E links can comprise a particular number of lanes conforming to PCI-E standard link widths of 1, 2, 4, 8, 12, or 16 lanes. "Maximum link width", as used herein, refers to that maximum number of the lanes that a link, a link connector, or a device connected to a link can configure or otherwise utilize. For example, a PCI-E link, link connector, or device can have a maximum link width of any of the PCI-E standard link widths.

Figure 1:
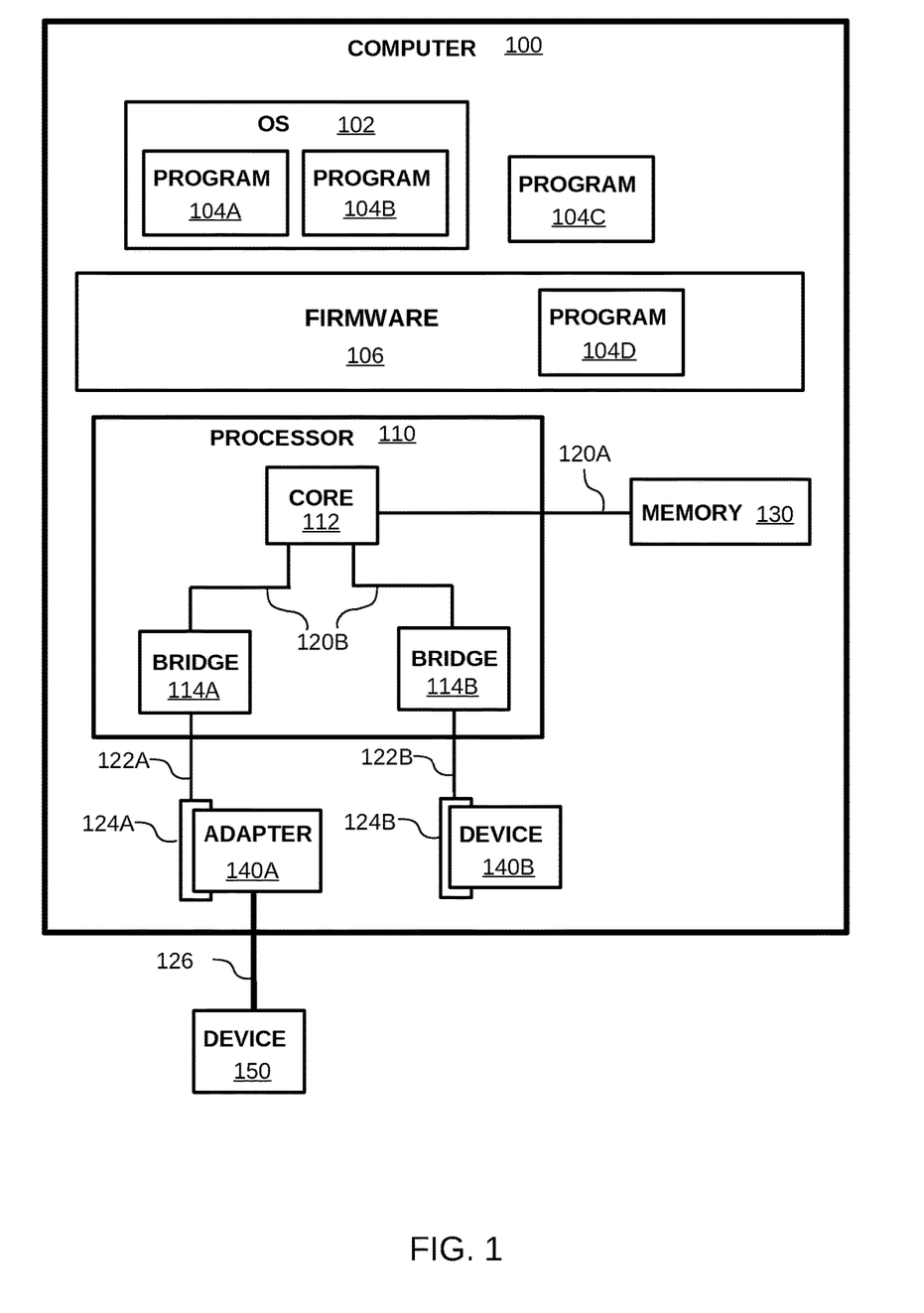
FIG. 1 is a block diagram illustrating a computer having a computer link, according to aspects of the disclosure.

FIG. 1 illustrates an example computer embodying aspects of the disclosure. In the example embodiment of FIG. 1, computer 100 includes hardware devices interconnected by various interface links: processor 110, memory 130, adapter 140A and device 140B (hereinafter, "devices 140" refers, collectively, to adapter 140A and device 140B). Processor 110 includes processor core 112, which connects processor 110 to memory 130 by means of interface link 120A. Core 112 additionally connects processor 110 to bridges 114A and 114B (collectively, "bridges 114") by means of interface links 120B. Link 120A, and/or links 120B, can be, for example, a QPI or a memory bus. Device 150 connects to adapter 140A by means of another interface link, 126, which can be, for example, a Fiber Channel or SATA link.

In embodiments, a bridge can perform particular functions to operate a link, such as configuring or initializing a link for communications, sending and receiving bits, or bytes, of information on the link, recording errors, and so forth. For example, bridges 114A and 114B can operate links 122A and 122B (collectively, "links 122), respectively, to connect core 112 (or, processor 110 and/or memory 130) to the respective devices 140. In one embodiment, links 122 can be, for example, PCI-E links and bridges 114 can be PCI-E host bridges (PHBs), which can operate the corresponding PCI-E links 122 and can interconnect links 122 to processor 110, core 112, and/or memory 130.

A bridge can interconnect, or "bridge", one interface link to another interface link. Links 120A and/or 120B can have lanes, or can have bit positions (e.g., within a parallel memory or processor bus) comprising the links that correlate to lanes of other links, such as links 122A and/or 122B that connect bridges 114A and 114B to respective devices 140. Bridges 114, or other elements of processor 110 or core 112, for example, can operate to associate lanes of links 122 with lanes, or bits, of links 120B and/or 120A.

Embodiments of a link can include a link connector, which can connect removable devices or, alternatively, can provide a connection point to a device on, for example, a system planar. For example, in FIG. 1, computer 100 includes link connectors 124A and 124B (collectively "connectors 124") that connect to links 122A and 122B, respectively. Link connectors 124 can allow adapter 140A and/or device 140B to be removed from or inserted into computer 100 on the corresponding links.

While example computer 100 illustrates only a single processor (110), a single core (112) within the processor, and a single memory (130), it will be understood by one of ordinary skill in the art, and within the scope of the disclosure, that a computer can include a plurality of processors, cores within processors, and/or memory modules, of various differing or similar types, and that the processors, cores, and/or memories can be interconnected in manners and/or configurations other than as illustrated in FIG. 1. Similarly, a computer can include more or fewer adapters and/or devices than are illustrated in FIG. 1, the adapters and devices can be of varying other types, and the adapters and devices can be connected in manners and/or configurations other than as illustrated.

Computer 100 also includes programming components firmware 106, operating system (OS) 102, and programs 104A-104D (collectively, "programs 104). Programs 104A and 104B execute within OS 102 and can embody functions of OS 102 and/or application functions hosted within OS 102. Program 104D is a component of firmware 106 and can embody, for example, functions to operate hardware devices within the computer and/or facilitate the execution of OSes (e.g., OS 102) and/or programs executing within an OS. It will be appreciated by one of ordinary skill in the art that, in embodiments, computer 100, OS 102, firmware 106, and/or other elements of computer 100 not illustrated, can each include a variety of programs other than those shown, which can perform functions other than those described herein.

In embodiments, a processor (or, other hardware device, such as a bridge) can include hardware registers that allow programs in the computer to control, monitor, or otherwise manage the operations of hardware devices, such as bridges and/or links. For example, one or more of programs 104 (e.g., program 104D in firmware 106) can execute on processor 110 to manage the hardware devices included in (or, connected to) computer 100 using, for example, registers (not shown) included in processor 110 and/or bridges 114. The hardware registers can include controls to determine the configuration of lanes, or to re-configure lanes, forming or included in links, such as lanes forming links 122.

Embodiments can include hardware devices (not shown in FIG. 1) to associate, or configure, particular lanes of a link (e.g., lanes of link 120B), as the link connects to one device (e.g., core 112), with particular lanes of that link as it connects to another device (e.g., one or both of bridges 114). For example, links 120B can connect to core 112 utilizing a routing device (not shown) interposed between lanes of links 120B connected to core 112 and lanes of links 120B connected to bridges 114. Such a routing device can, in turn, determine (or, configure) which of the lanes of links 120B connected to core 112 connect, or "route", to particular lanes of links 120B connected to each of bridges 114A and 114B.

Figure 2A:
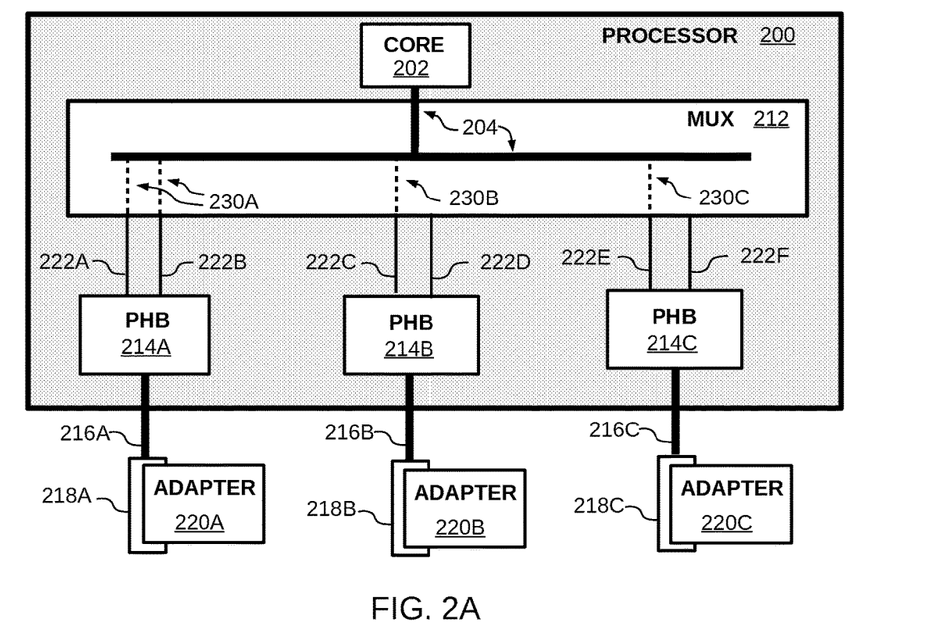
FIG. 2A is a block diagram illustrating configurable signal lanes routed between a processor core and a plurality of bridges, according to aspects of the disclosure.
Figure 2B:
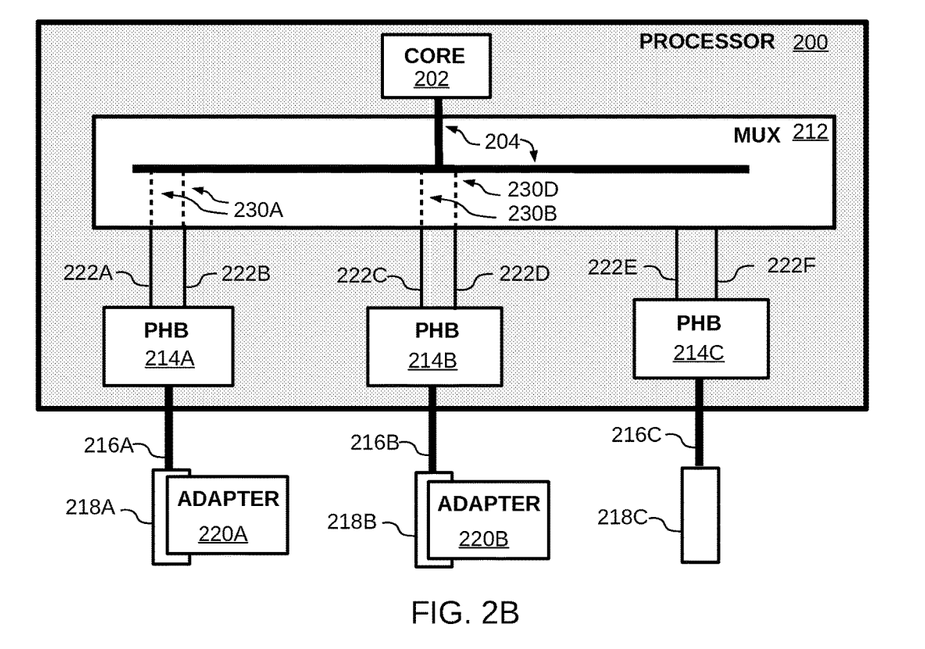
FIG. 2B is a block diagram illustrating configurable signal lanes in an alternate routing between the processor core and the plurality of bridges, according to aspects of the disclosure.

FIGS. 2A and 2B (collectively, "FIG. 2") illustrate example embodiments and configurations of hardware devices and links in which lanes forming the links can be dynamically configured, or routed, between devices connected to those links. "Configuring", and "re-configuring", lanes within a link, as used herein, refers to incorporating (or, "including") lanes into a link or, alternatively, removing lanes from a link. "Dynamically configurable" refers, herein, to links in which the configuration of the lanes (e.g., the number of lanes included in the links) can be modified (i.e., re-configured) while a computer including or utilizing the links is operating; although, a link may be powered off, quiesced, or otherwise have link operations suspended in order to modify the lane configuration of the link.

FIG. 2 illustrates the example embodiments in the context of a computer, such as computer 100 of FIG. 1, having a processor core that connects through a lane routing device to PCI-E PHBs that form PCI-E links. However, the examples of FIG. 2 are not intended to limit embodiments; rather, it will be apparent to one of ordinary skill in the art that, in embodiments, dynamically configurable links are not limited to PCI-E nor to links connected to PHBs, the devices connected by the links are not limited to processors (or, cores of a processor) and/or bridges, and that the hardware devices, including a lane routing device, can be any of a variety of hardware devices connected by links in various configurations and combinations, other than as shown in FIG. 2.

In FIG. 2, processor 200 includes processor core 202 and PHBs 214A, 214B, and 214C (collectively, "PHBs 214"). Lanes 204 connect core 202 to PHBs 214 through a lane routing device, MUX 212. Core 202 is illustrated in FIG. 2 as a single core; however, in embodiments a plurality of cores within a processor, and/or a plurality of processors, can be connected to lanes 204, and/or to multiple instances (not shown) of lanes 204.

PHBs 214 connect to MUX 212 by means of respective links comprising sets of lanes—222A, 222B, 222C, 222D, 222E, and 222F (collectively, "links 222"). PHBs 214 operate respective PCI-E links 216A, 216B, and 216C (collectively, "links 216"). Links 216 connect, respectively, to adapters 220A, 220B, and 220C (collectively, "adapters 220") by means of respective link connectors 218A, 218B, and 218C (collectively, "connectors 218"), which can, in turn, enable the adapters to be removable.

MUX 212 can include circuitry (not shown) that can configure or route (e.g., internal to the MUX) particular lanes among lanes 204 to connect to particular lanes among links 222, which PHBs 214, can in turn, include in links 216. For example, MUX 212 can include a form of crossbar switch that can selectively (e.g., by means of programmable hardware registers) route particular lanes among lanes 204 to particular lanes among links 222, to connect subsets of lanes 204 to each of PHBs 214. The PHBs can, in turn, connect lanes among their respective links 222 to lanes of their respective links among links 216.

In embodiments, the number of lanes connecting to some devices (e.g., a processor and/or memory), and configured through a lane routing device (e.g., a multiplexor or switch) can be less than the number of lanes connecting to other devices (e.g., bridges) or included in links associated with those devices (e.g., PCI-E links associated with PHBs). To illustrate, but not intended to limit embodiments, in the example configurations of FIG. 2, lanes 204 can comprise a total of 32 lanes and each of links 216 can have a link width of up to 16 lanes. The 48 lanes comprising the collective maximum link widths of links 216 can, then, exceed the 32 lanes comprising lanes 204.

In the example configuration of FIG. 2A, each set of lanes within links 222 can comprise 8 lanes. Lane sets 222A and 222B connect to PHB 214A and lane set 222A can form (for example) the low-order byte of link 216A and lane set 222B can form (for example) the high-order byte of link 216A. Lane sets 222C and 222D connect to PHB 214B and lane sets 222E and 222F connect to PHB 214C. Each of lane sets 222C and 222E can form (for example), respectively, the low-order byte of respective links 216B and 216C, and each of lane sets 222D and 222F can form (for example), respectively, the high-order byte of links 216B and 216C.

MUX 212 can distribute all 32 lanes of lanes 204 among PHBs 214 by routing lanes within lanes 204 to individual lanes within links 222. As shown in the example configuration of FIG. 2A, MUX 212 routes (230A) 8 lanes of lanes 204 to lane set 222A and 8 lanes of lanes 204 to lane set 222B, which allows PHB 214A to form link 216A as a 16-lane link. As further shown in the example configuration of FIG. 2A, MUX 212 routes (230B and 230C) 8 lanes of the 16 lanes remaining (from the initial 32) of lanes 204 to each of lane sets 222C and 222E, which allows each of PHBs 214B and 214C to form links 216B and 216C, respectively, as 8-lane links. As this utilizes all 32 of lanes 204, MUX 212 does not connect any of lanes 204 to lane sets 222D and 222F.

In an embodiment, an adapter connected to a link may be capable of utilizing more lanes than are included in that link. Configuring a link with fewer lanes than an adapter (or, a device) connected to that link can utilize can limit the performance of the adapter (or, device). For example, in FIG. 2A adapter 220B can be an adapter capable of utilizing 16 lanes, while link 216B is configured (in FIG. 2A) to include only 8 lanes. Link 216B having only 8 lanes can, correspondingly, limit the performance of adapter 220B. Accordingly, in the event that some or all lanes of another link (e.g., link 216C) are not used, and the lanes are dynamically reconfigurable, including unused lanes of link 216C in link 216B can, for example, improve the performance of adapter 220B.

Various operations directed to, or associated with, a link or a link connector can result in lanes of a link becoming unused. As used herein, "link operation" refers to any operation associated with a link, link connector, or device connected to a link that results, or can potentially result, in lanes of a link becoming unused. Also as described herein, a link operation directed to "a link" refers to an operation directed to any of the link itself, a link connector associated with the link, and/or a device connected to a link or link connector. Various examples following illustrate link operations that can result in lanes of a link becoming unused.

In one example, embodiments can include circuitry to allow selectively removing electrical power (or, optical signaling, for example) to a link (e.g., link 216C, connector 218C, and/or adapter 220C) independent of the state of power (or, optical signaling) to other hardware components of the computer (e.g., links 216A and 216B, and/or adapters 220A and 220B). Selectively removing power to a link in this way is referred to herein as "hot plug power off". A hot plug power off operation can simply remove power to a link, and a device connected to the link can remain connected.

Alternatively, a hot plug power off operation can enable removing a device connected to a link from the computer, referred to herein as "hot plug remove". In some embodiments, a system operator or administrator, or a program (e.g., an operating system, or firmware), can initiate a hot plug power off operation directed to a link, and can (optionally) determine that power is removed. In other embodiments, hot plug circuitry can detect physical removal of a device from a link (e.g., from a link connector), and can remove power in response.

Embodiments can include virtualized computers, and a virtual machine (VM) executing in a virtualized computer can be allocated a link, or allocated a device connected to a link. A hot plug power off operation of a link can be, or can be associated with, logically "powering off" the VM. Powering off the VM can, optionally, include hot plug power off of the link, or can include powering off (e.g., by a device driver in the VM) the device connected to the link. Powering off the VM can result in the device, and correspondingly the link connecting the device, becoming unused. Hot plug power operations can, accordingly, result in lanes of a link becoming unused. For example, as a result of hot plug power off of link 216C, lanes 222E can become unused.

In embodiments, lanes of a link can become unused and, correspondingly, available for re-configuration to other links, for reasons other than hot plug operations. In one example embodiment, a device connected to a link can discontinue use of particular lanes. For example, a device can determine that, as a result of conditions internal to the device (e.g., a failure of some component or a subset of lanes), the device cannot utilize all of the lanes of a link. The device may, then, discontinue use of those un-utilized lanes. In another example, a device that implements a PCI-E link can, for example, "downshift" the link from a higher number of lanes (e.g., 16) to a lower number of lanes (e.g., 8 or 12), such that higher order lanes become unused.

Accordingly, embodiments can include a mechanism (e.g., a hardware device such as MUX 212 of FIG. 2) to re-configure unused lanes associated with (or included in) one link to incorporate some or all of those lanes in other links, such as links having fewer lanes configured than a maximum link width. FIG. 2B illustrates the example of FIG. 2A in which lanes of one link have become unused and are dynamically reconfigured to include in another link. To illustrate the example, in FIG. 2B, adapter 220C is removed from link connector 216C (e.g., using a hot plug operation; although, removing adapter 220C can be optional following the hot plug power off). Correspondingly, lane set 222E becomes unused. Lanes among lanes 204 that were previously connected to lane set 222E can, then, be re-configured within, or by, MUX 212 to route (230D) to lanes 222D, thereby increasing the number of lanes in link 216B from 8 to 16.

Embodiments are not limited to configuring, or re-configuring, lanes of links in multiples of 8, as illustrated in the examples of FIG. 2. For example, any or all of links 222 can comprise a number of lanes ranging from 1 to a maximum link width associated with their respective PHBs (e.g., a maximum link width of the link, link connector, or adapter connected to the respective PHBs of PHBs 214). Embodiments also need not be limited to re-configuring unused lanes to increase the number of lanes of just a single other link. It will be apparent to one of ordinary skill in the art that any particular subset of unused lanes can be re-configured to increase the lanes included in one link, while another subset of those unused lanes can be re-configured to increase the lanes included in one or more other links.

Embodiments can include a component that detects a link operation. For example, an embodiment can include hot plug circuitry that detects loss of connection with a device connected to a link connector, such as previously described. In response, the detection component can signal another component of the computer, such as a program or other circuitry, to indicate that the link operation has occurred, and which can (optionally) initiate reconfiguring lanes of the associated link to include in other links.

In other embodiments, a program or hardware device (for example) included in, or in communication with, the computer can periodically inspect (e.g., "poll") a state of a link connector to detect that a device, previously detected in the link connector, has been powered off and/or removed. Programs, and/or hardware devices can detect other link operations that can result in unused lanes, such as power off of a device connected to a link. In some embodiments, a program and/or hardware device can detect, or receive a signal (e.g., from a device), that a device has discontinued use of some or all lanes of a link for various reasons, including reasons other than hot plug (e.g., downshifting the number of lanes used).

Figure 3:
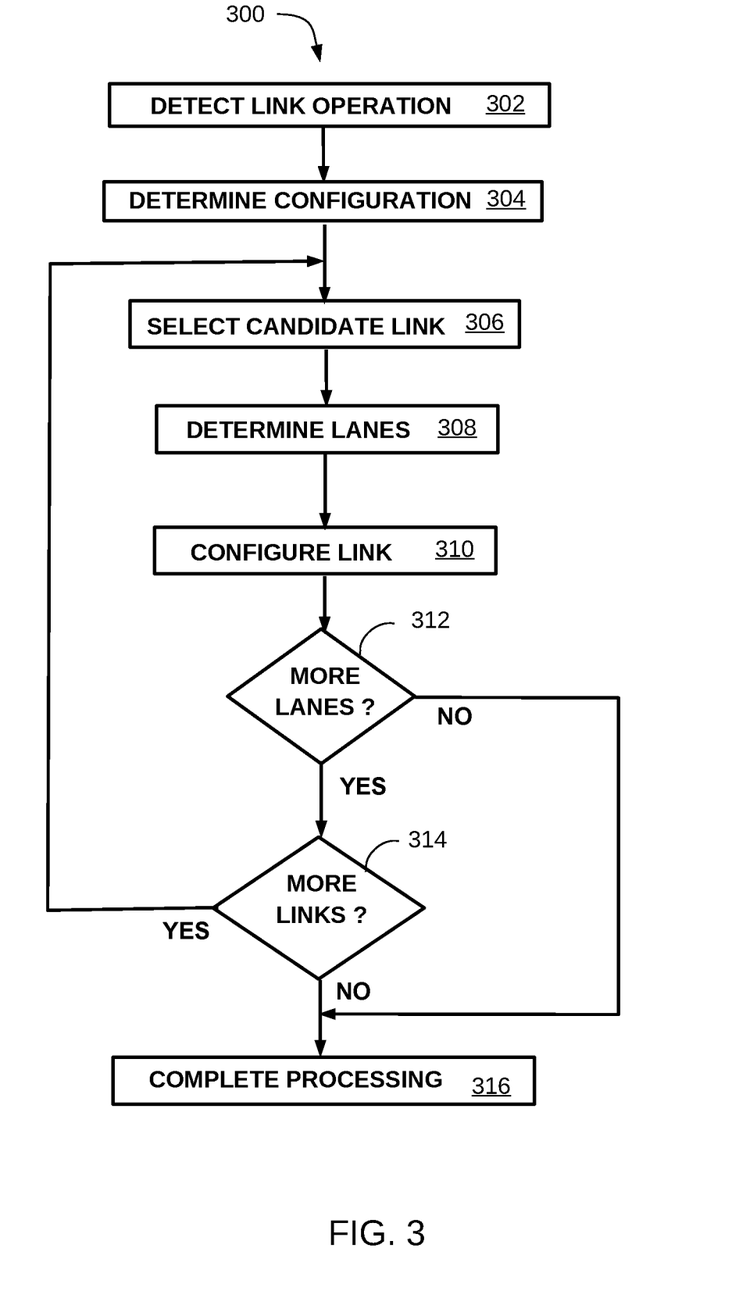
FIG. 3 is a flowchart that illustrates an example method to re-configure lanes of a computer link, according to aspects of the disclosure.

In response to detecting (or, receiving a signal or otherwise becoming aware) that a link operation has occurred that may have made a set of dynamically configurable lanes unused within a link, embodiments can select one or more other links and/or re-configure lanes to incorporate into other links. FIG. 3 illustrates an example method, 300, to dynamically re-configure some or all of the lanes of a link that have become unused as a result of a link operation. While not intended to limit embodiments, FIG. 3 illustrates the example method in the context of the foregoing examples of FIG. 1, 2A, and 2B. To further illustrate the example method, but also not intended to limit to embodiments, the method is described as performed by a program, such as firmware program 104D of FIG. 1, hereinafter in illustrating example method 300, referred to as "the program". However, it will be appreciated by one of ordinary skill in the art that the method can be performed by any of a variety of types or numbers of programs, can be performed by, or in combination with, one or more hardware components, and that the program(s) and/or hardware component(s) can be included in a computer having dynamically reconfigurable links, and/or can be included, in part or in whole, in one or more computers in communication with a computer that has dynamically reconfigurable links.

As previously described, lanes of a link can become unused as a result of any or a variety of link operations. In reference to example method 300, "the operation" refers to any operation directed at a link, such as described in the foregoing examples, that results in lanes of a link becoming, or potentially becoming, unused. "Unused lanes", in reference to example method 300, refers to dynamically configurable lanes made available for reconfiguration to add to other dynamically configurable links sharing the same lane routing device.

At 302, the program detects (or, otherwise becomes aware of) the operation applied to a link (e.g., power off of link 216C and/or removal of adapter 220C). In embodiments, a program (or, alternatively a hardware component) can detect the operation by means of a signal from hardware associated with a link, such as, for example, a program interrupt or a status bit in a hardware register. In some embodiments, a program or hardware component can detect the operation by periodically polling, or sampling, a status associated with the link, or a device connected to a link (e.g., a hot plug power off, or device removed, state). A program or hardware component can perform, or participate, in the operation, and the program or hardware can be aware of (for example) power off or removal of a link or device as a result of performing or participating in the operation. In some embodiments, a program can receive a message (e.g., from another program, or from a device connected to a link) indicating that a link operation has occurred.

In response to the operation, at 304 the program determines a link configuration associated with links included in the computer, and/or links associated with the link subject to the operation. The link configuration can include the number of lanes, and/or particular lanes, of a link that have become unused as a result of the operation. For example, at 304 the program can determine that the link subject to the operation (e.g., link 216C of FIG. 2B) comprises 8 unused lanes. A link configuration can include other links that comprise fewer lanes than a maximum link width associated with those other links. The link configuration can include, for example, a set of links that share a common lane routing mechanism or device (e.g., MUX 212 of FIG. 2A). For example, at 304 the program can determine that the link configuration includes link 216B as sharing lane routing (through MUX 212) with link 216C. The link configuration can include the configurations of various attributes of the links, link connectors, and/or devices connected to the links, such as lane width or signaling rate.

The link configuration can include attributes, and/or characteristics, of links, link connectors, and/or devices (e.g., adapters 220) connected to the links. For example, in the example of FIG. 2B, the program can determine the types or models of each of adapters 220A and/or 220B, and/or the maximum link width of each of adapters 220A and/or 220B or connectors 218A and/or 218B, and can include these in the link configuration. The link configuration can include, for example, links, link connectors, and/or devices connected to the links, which are or, alternatively, are not, configured to their maximum link width.

Based on the link configuration determined at 304, at 306 the program selects a candidate link to include some or all of the unused lanes. In one example, the program can select a link that has fewer signal lanes configured than a maximum link width, such as link connector 218B in FIG. 2A having a maximum link width of 16 lanes and link 216B configured with 8 lanes. In another example, the link configuration can include a physical location of the links, or link connectors, within a computer. The program can select a candidate link based on that link having a particular physical location, such as a location having a shorter hardware path length (within the computer) between a device connected to the link and (for example) a processor, as compared to other links.

In come embodiments, a candidate link can be based on a system policy of a computer. For example, a link configuration determined at 304 can include a type, or model, of a device connected to a link. A system policy can prioritize increasing link width of a link connected to a device of one particular type, or model, of a device over increasing link width of links that connect to a device of another type, or model. Correspondingly, a link can be a candidate link based on the link connecting a device of that particular, higher priority type or model as compared to devices connected to other links.

In another example, a system can include a plurality of devices of a particular type, such as disk adapters, and one device (connected to one link) can be a backup of another device (connected, for example, to another link) and the backup device can be selected based on a system policy that places a higher priority on increasing link width of backup devices, compared to devices connected to other links that are not backup devices. A system policy can be based on workloads executing in a computer. For example, a computer can (at any particular time) execute primarily storage workloads and a system policy can place a higher priority on increasing link width of storage devices versus links connected to devices of other types, such as network devices, based on the computer executing primarily storage workloads.

A link configuration determined at 304 can include a number of lanes included in pre-determined, or allowable, link widths such as PCI-E link widths of 1, 2, 4, 8, 12, or 16 lanes. A candidate link can be a link in which unused lanes can increase the number of lanes included in the link to a larger allowable number of lanes, such as increasing a PCI-E link from 8 to 12 or 16 lanes. It would be apparent to one of ordinary skill in the art that a variety of configurations and/or attributes of a link, link connector, and/or a device connected to a link, in addition to the foregoing examples, can be included in a link configuration used as a basis to select a candidate link.

At 308 the program determines a number of the unused lanes to dynamically re-configure to include in the candidate link. In embodiments, the number of lanes to include can be based, for example, on an attribute of a candidate link. A link attribute can be, for example, the difference between the number of lanes configured in a candidate link and the maximum link width of a link connector or device connected to that candidate link. Using the example of FIG. 2B, link 216B has a maximum link width of 16 lanes but includes only 8 lanes (lane set 222C), such that a link attribute of link 216B can be that it can incorporate an additional 8 lanes. Accordingly, the program can select all 8 of the unused lanes of lane set 222E to include in link 216B. Alternatively, in FIG. 2A adapter 220B can be limited to a maximum link width of 12 lanes, such that a link attribute of link 216B can be that it can incorporate an additional 4 lanes, but cannot benefit (based on the inability of adapter 220B to utilize more than 4 additional lanes) from incorporating all 8 unused lanes of link 216C. Accordingly, the program can select a subset of 4 of the 8 unused lanes of lane set 222E to include in link 216B.

In another example, the program can determine the number of unused lanes to configure in a manner that distributes unused lanes across as many candidate links as there are lanes available to form links complying with defined link widths. Such a distribution can be independent of any attributes of the devices connected to those links, or can depend on only whether or not a candidate link is configured for the maximum link width of the device connected to that link. For example, a processor can include more than the 3 PHBs illustrated in the examples of FIG. 2 and a lane routing device can configure a plurality of the PHBs with fewer lanes from a processor core than a maximum width of PCI-E links connected to those PHBs. In response to a link operation directed to one of the PCI-E links, a program can distribute the unused lanes connected to that link (e.g., from the lane routing device) to as many as possible of the other PHBs, based on the standardly defined widths of PCI-E links that those PHBs can form. It would be apparent to one of ordinary skill in the art that a variety of attributes of a link, link connector, and/or a device connected to a link, in addition to the foregoing examples, can form a basis to select a number of unused lanes to include in a candidate link.

At 310, the program performs the processing necessary to configure the lanes determined at 308 into the selected link. In embodiments, configuring the lanes can utilize, for example, programmable hardware registers. The registers can be included in a hardware component of the computer, such as in a processor or processor core, a lane routing device (e.g., multiplexor or crossbar switch), one or more PHBs, or other hardware components associated with the hardware devices that route lanes within the links.

According to various circumstances, such as previously described, a program can determine to include fewer lanes in a candidate link than the number of unused lanes. Further, an embodiment can include, at any particular time, more than one candidate link and, based on unused lanes remaining after including some of the unused lanes in a prior candidate link, can include some or all of the remaining unused lanes in other candidate links. At 312 the program determines if there are more unused lanes remaining available to configure into other candidate links. If there are unused lanes remaining, at 314 the program determines if there are other candidate links remaining. If there are remaining candidate links, the program repeats 308 through 312.

If, at 312, there are no additional unused lanes or, at 314, there are no additional candidate links, at 316 the program completes any processing associated with the operations of 302 through 310. Such processing can include, for example, resetting or clearing status indications or signals (e.g., an interrupt) associated with detecting the operation at 302. Processing can include programming hardware registers, or activating hardware devices, to enable the links to make the newly configured lanes, or the link as a whole, operable. Processing can include issuing a form of reset or other signal to a link, or to a device connected to a reconfigured link to cause the link or device to fully configure the link, or the device, for operating the link with the newly configured lanes. Processing can include activating a link re-initialization (e.g., signal re-training) operation. As an alternative to configuring, at 310, unused lanes within one or more of the candidate links selected at 306, an embodiment can defer the processing at 310 to be performed as part of completing processing at 316.

While the examples of the disclosure are illustrated in terms of links of the same type, it will be appreciated by one of ordinary skill in the art that links of differing types, or applications, can be reconfigured to use lanes of another link that become unused as a result of a plug removal of a device connected to that other device (or, any of the previously described operations that can result in lanes of a link becoming unused).

Figure 4:
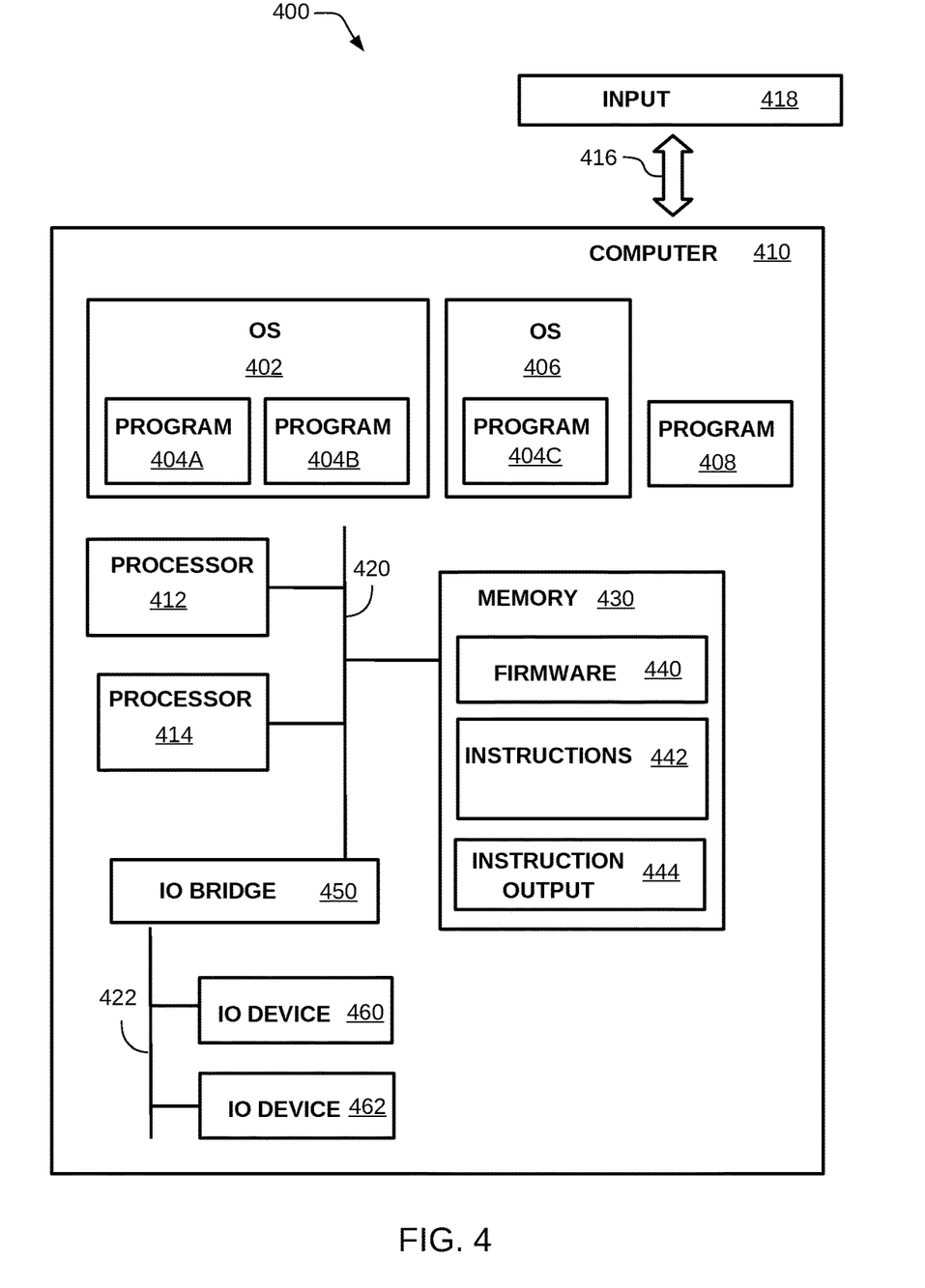
FIG. 4 is a block diagram illustrating a computer that can embody aspects of the disclosure.

Embodiments of the disclosure can be, or can include a computing system, such as illustrated in the example of FIG. 4. As shown in FIG. 4, computing system 400 includes computer 410 having processors 412 and 414. In embodiments, processors can be a single processor or a multi-threaded processor, a general purpose or a special purpose processor, a co-processor, or any of a variety of processing devices that can execute computing instructions. Processors included in computer 410 can include one or more cores (not shown), and can include or be connected to lane routing devices (also not shown) for dynamically configuring lanes included in various interface links, according to the foregoing examples of the disclosure.

Computing system 400 is configured with interface 416 coupling computer 410 to input source 418. In embodiments, interface 416 can enable computer 410 to receive, or otherwise access input data, such as (for example) a signal, or message, indicating a link operation associated with a particular link, indicating a status of a device connected to a link, and/or indicating (such as a timer signal) to inspect one or more links to detect a possible link operation (e.g., a hot plug operation). Interface 416 can be, for example, a network (e.g., an intranet, or a public network such as the Internet), or a storage medium, such as a disk drive internal or connected to computer 410. Input source 418 can be, for example, a program or hardware component operating on, or in communication with, a computer having dynamically configurable links, and input source 418 can provide information regarding the links, link connectors, and/or devices, or actions related thereto, to computer 410, or otherwise enable computer 410 to receive the information, using interface 416.

Interface 416 can be configured to receive human input, or to couple computer 410 to other input devices. It would be apparent to one of ordinary skill in the art that the interface can be any of a variety of interface types or mechanisms suitable for a computer, or a program operating in a computer, to receive or otherwise access or receive a source netlist.

Processors included in computer 410 are connected by memory interface 420 to memory 430. In embodiments, a memory can be a cache memory, a main memory, a flash memory, or a combination of these or other varieties of electronic devices capable of storing information and, optionally, making the information, or locations storing the information within the memory, accessible to a processor. A memory can be formed of a single electronic (or, in some embodiments, other technologies such as optical) module or can be formed of a plurality of memory modules. A memory, or a memory module (e.g., an electronic packaging of a portion of a memory), can be, for example, one or more silicon dies or chips, or can be a multi-chip module package. Embodiments can organize a memory as a sequence of bytes, words (e.g., a plurality of contiguous or consecutive bytes), or pages (e.g., a plurality of contiguous or consecutive bytes or words).

In embodiments, a computer can include a plurality of memories. A memory interface, such as memory interface 420, between a processor (or, processors) and a memory (or, memories) can be, for example, a memory bus common to one or more processors and one or more memories. In some embodiments, a memory interface, such as memory interface 420, between a processor and a memory can be a point to point connection between the processor and the memory, and each processor in the computer can have a point-to-point connection to each of one or more of the memories. In other embodiments, a processor (for example, processor 412) can be connected to a memory (e.g., memory 430) by means of a connection (not shown) to another processor (e.g., processor 414) connected to the memory (e.g., 420 from processor 414 to memory 430). Memory interface 420 can be, in some embodiments, an interface link.

A computer can include an input/output (IO) bridge, which can be connected to a memory interface, a processor interface, and/or an interface common to processors and memories, such as interface 420. In some embodiments, an IO bridge can be a component of a processor or a memory. An IO bridge can interconnect processors and/or memories of a computer (or, other devices) to IO devices connected to the bridge. For example, computer 410 includes IO bridge 450 interconnecting memory interface 420 to IO devices 460 and 462. In some embodiments, an IO bridge can connect directly to a processor or a memory, or can be a component included in a processor or a memory. An IO bridge can be, for example, a PCI-Express or other IO bus bridge. An IO bridge can be connected to one or more dynamically configurable links.

An IO bridge can connect to IO devices by means of interface, such as IO interface 422. Interface 422 can be an interface link, such as a PCI-Express link. Interfaces 420 and 422 can include dynamically configurable lanes, and a lane routing device (not shown) can be interposed between processors 412 and/or 414 and IO bridge 450 to facilitate dynamically configuring lanes of interface 420 to IO bridge 450.

IO devices can be any of a variety of peripheral IO devices or IO adapters connecting to peripheral IO devices. For example, IO devices 460 and 462 can be a graphic card, keyboard or other input device, a hard drive or other storage device, a network interface cards, etc. IO devices can be connected to an interface by means of link connectors (not shown), and the IO devices can be subject to hot plug operations or other operations that modify the state of their connection to IO interface 422. For example, IO device 460 can be an IO adapter, such as a PCI-Express adapter, that connects components (e.g., processors or memories) of a computer to IO devices (e.g., disk drives, Ethernet networks, video displays, keyboards, mice, etc.). IO device 460 can be connected to IO interface 422 by means of a link connector and IO interface 422, and/or the link connector can facilitate hot plug operations directed to IO devices 460 and/or 462, such that lanes of the interfaces 422 and/or 420 can become unused.

A computer can include instructions executable by one or more of the processors (or, processing elements, such as threads of a processor). The instructions can be a component of one or more programs. The programs, or the instructions, can be stored in, and/or utilize, one or more memories of a computer. As illustrated in the example of FIG. 4, computer 410 includes a plurality of programs, 404A-404C and 408. A computer can include one or more operating systems, and an operating system can control the execution of other programs such as, for example, to start or stop a program, or to manage resources of the computer used by a program. For example, computer 410 includes operating systems (OSes) 402 and 406, each of which can include, or manage execution of, one or more programs, such as OS 402 including (or, managing) program 404A and 404B and OS 406 including (or, managing) program 404C.

A program can be a hypervisor, and the hypervisor can, for example, manage sharing resources of the computer (e.g., a processor or regions of a memory, or access to an IO device) among a plurality of programs or OSes. A program can be a program that embodies the methods, or portions thereof, of the disclosure. In some embodiments, an operating system can function as a hypervisor.

Programs can be "stand-alone" programs that execute on processors and use memory within the computer directly, without requiring another program to control their execution or their use of resources of the computer. For example, computer 410 includes stand-alone program 408. A stand-alone program can perform particular functions within the computer, such as controlling, or interfacing (e.g., access by other programs) an IO interface or IO device. A stand-alone program can, for example, manage the operation, or access to, a memory. A Basic I/O Subsystem (BIOS), or a computer boot program (e.g., a program that can load and initiate execution of other programs) can be a standalone program.

A program can be embodied as firmware (e.g., BIOS in a desktop computer, or a hypervisor) and the firmware can execute on one or more processors and, optionally, can use memory, included in the computer. Firmware can be stored in a memory (e.g., a flash memory) of the computer. For example, computer 410 includes firmware 440 stored in memory 430. In other embodiments, firmware can be embodied as instructions (e.g., comprising a computer program product) on a storage medium (e.g., a CD ROM, a flash memory, or a disk drive), and the computer can access the instructions from the storage medium.

A program can embody the methods, or portions thereof, of the disclosure. For example, a program can execute on a processor of computer 410 to perform the example method 300 of FIG. 3, or portions thereof. In embodiments of the present disclosure, a computer can include one or more programs comprising instructions to perform the example method 300 of FIG. 3, or portions thereof. Computer 410 includes, for example, instructions 442 which, when executed by one or more of processors 412 and 414, can operate to perform one or more of the functions of method 300 of FIG. 3 to dynamically reconfigure unused lanes of, for example, interface 422. Instructions 442 can output the results of their execution (e.g., the configuration of dynamically configurable links, and/or a set of candidate links to reconfigure) to instruction output 444. The computer can store the instructions and/or the instruction output in a memory of the computer, such as computer 410 storing program instructions 442 and instruction output 444 in memory 430.

The example computing system 400 and computer 410 are not intended to be limiting to embodiments. In embodiments, computing system 400 can include a plurality of processors, interfaces, and input sources, and can include other elements or components, such as networks, network routers or gateways, storage systems, server computers, virtual computers or virtual computing and/or IO devices, cloud-computing environments, and so forth. It would be evident to one of ordinary skill in the art to include a variety of computing devices interconnected in a variety of manners in a computer system embodying aspects and features of the disclosure.

In embodiments, computer 410 can be, for example, a computing device having a processor capable of executing computing instructions and, optionally, a memory in communication with the processor. For example, computer 410 can be a desktop or computer, a tablet computer, mobile computing device, or cellular phone, or, a server computer, a high-performance computer, or a super computer. It would be apparent to one of ordinary skill in the art that a computer embodying aspects and features of the disclosure can be any of a variety of computing devices having processors and, optionally, memories and/or programs.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause the computer, other programmable apparatus, or other device to perform a series of operational steps to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
    determining that a link operation associated with a first link, among a plurality of interface links included in a computing system, has resulted in a first set of signal lanes becoming unused, the first set of signal lanes included in the first link;
    determining, based at least in part on the link operation, a link configuration associated with the plurality of interface links;

selecting, based at least in part on the link configuration, a second link among the plurality of interface links;

determining, based at least in part on a link attribute associated with the second link, a second set of signal lanes, the second set of signal lanes comprising signal lanes among the first set of signal lanes; and dynamically re-configuring the signal lanes among the second set of signal lanes to be included in the second link;

wherein the link configuration comprises a number of signal lanes configured in links among the plurality of interface links, and wherein the selecting the second link is based, at least in part, on the second link configured with fewer signal lanes than a third link among the plurality of interface links.

2. The method of claim 1 further comprising:

determining that the second set of signal lanes comprises fewer than all of the signal lanes in the first set of signal lanes;

selecting, based at least in part on the link configuration, a third link among the plurality of interface links;

determining, based at least in part on a link attribute associated with the third link, a third set of signal lanes, the third set comprising signal lanes among the first set of signal lanes not included in the second set of signal lanes; and dynamically re-configuring the signal lanes among the third set of signal lanes to be included in the third link.

3. The method of claim 1, wherein the link operation comprises a hot plug operation.

4. The method of claim 1, wherein the link configuration comprises a number of signal lanes configured in links among the plurality of interface links, and wherein the selecting the second link is based, at least in part, on the second link configured with a number of signal lanes less than a maximum link width associated with at least one of the second link and a device connected to the second link.

5. The method of claim 1, wherein the link attribute comprises a number of signal lanes included in the second link, and wherein the determining the second set of signal lanes comprises determining to include in the second link a number of signal lanes among the first set of signal lanes that increases the number of signal lanes included in the second link to a number of signal lanes corresponding to an allowable link width.

6. The method of claim 1, wherein the link attribute comprises a number of signal lanes that can be utilized by a device connected to the second link, and wherein the determining the second set of signal lanes comprises determining to include, in the second link, a number of signal lanes, among the first set of signal lanes, that increases the number of signal lanes included in the second link to a number of signal lanes that can be utilized by the device.

7. A computing system comprising:

a lane routing device;

a plurality of interface links;

a first link among the plurality of interface links, wherein the first link comprises first signal lanes connected to the lane routing device;

a second link among the plurality of interface links, wherein the second link comprises second signal lanes connected to the lane routing device; and at least one first processor, wherein the at least one first processor is configured to:

determine that a link operation associated with the first link has resulted in a first set of signal lanes among the first signal lanes becoming unused;

determine, based at least in part on the link operation, a link configuration associated with the plurality of interface links;

select, based at least in part on the link configuration, the second link;

determine, based at least in part on a link attribute associated with the second link, a second set of signal lanes, the second set of signal lanes comprising signal lanes among the first set of signal lanes; and dynamically re-configure, using the lane routing device, the signal lanes included in the second set of signal lanes to be included in the second link;

wherein the system further comprises a third link among the plurality of interface links, wherein the third link comprises third signal lanes connected to the lane routing device, wherein the link configuration comprises a number of signal lanes configured in links among the plurality of interface links, and wherein the at least one first processor is further configured to select the second link based, at least in part, on the second link configured with fewer signal lanes than the third link.

8. The system of claim 7, wherein the system further comprises a third link among the plurality of interface links, wherein the third link comprises third signal lanes connected to the lane routing device, and wherein the at least one first processor is further configured to:

determine that the second set of signal lanes comprises fewer than all of the signal lanes included in the first set of signal lanes;

select, based at least in part on the link configuration, the third link;

determine, based at least in part on a link attribute associated with the third link, a third set of signal lanes, the third set comprising signal lanes among the first set of signal lanes not included in the second set of signal lanes; and dynamically re-configure, using the lane routing device, the signal lanes included in the third set of signal lanes to be included in the third link.

9. The system of claim 7, wherein the link operation is a hot plug operation.

10. The system of claim 7, wherein the link configuration comprises a number of signal lanes configured in links among the plurality of interface links, and wherein the first processor is further configured to select the second link based on the second link configured with a number of signal lanes less than a maximum link width associated with at least one of the second link and a device connected to the second link.

11. The system of claim 7, wherein the link attribute comprises a number of signal lanes included in the second link, and wherein the at least one first processor is further configured to include, in the second link, a number of signal lanes among the first set of signal lanes that increases the number of signal lanes included in the second link to a number of signal lanes corresponding to an allowable link width.

12. The system of claim 7, wherein the link attribute comprises a number of signal lanes that can be utilized by a device connected to the second link, and wherein the at least one first processor is further configured to include, in the second link, a number of signal lanes among the first set of signal lanes that increases the number of signal lanes included in the second link to a number of signal lanes that can be utilized by the device.

13. The system of claim 7, wherein the computing system includes at least one second processor, and wherein at least one of the first link and the second link is associated with the at least one second processor.

14. A computer program product for dynamically re-configuring signal lanes, the computer program product comprising a non-transitory computer readable storage medium having program instructions embodied therewith, the program instructions executable by a first processor to cause the first processor to:

determine that a link operation associated with a first link, among a plurality of interface links included in a computing system, has resulted in a first set of signal lanes, included in the first link, becoming unused;

determine, based at least in part on the link operation, a link configuration, the link configuration associated with the plurality of interface links;

select, based at least in part on the link configuration, a second link among the plurality of interface links;

determine, based at least in part on a link attribute associated with the second link, a second set of signal lanes, the second set of signal lanes comprising signal lanes among the first set of signal lanes; and dynamically re-configure the signal lanes among the second set of signal lanes to be included in the second link;

wherein the link configuration comprises a number of signal lanes configured in links among the plurality of interface links, and wherein the program instructions cause the first processor to select the second link based, at least in part, on the second link configured with a number of signal lanes less than a maximum link width associated with at least one of the second link and a device connected to the second link.

15. The computer program product of claim 14, wherein the program instructions further include program instructions to further cause the first processor to:

determine that the second set of signal lanes comprises fewer than all of the signal lanes included in the first set of signal lanes;

select, based at least in part on the link configuration, a third link among the plurality of interface links;

determine, based at least in part on a link attribute associated with the third link, a third set of signal lanes, the third set comprising signal lanes among the first set of signal lanes not included in the second set of signal lanes; and dynamically re-configure the signal lanes included in the third set of signal lanes to be included in the third link.

16. The computer program product of claim 14, wherein the link configuration comprises a number of signal lanes configured in links among the plurality of interface links, and wherein the program instructions cause the first processor to select the second link based, at least in part, on the second link configured with a number of signal lanes less than a maximum link width associated with at least one of the second link and a device connected to the second link.

17. The computer program product of claim 14, wherein the link attribute comprises at least one of a number of signal lanes included in the second link and a number of a signal lanes that can be utilized by a device connected to the second link, and wherein the program instructions cause the first processor to include in the second set of signal lanes a number of signal lanes among the first set of signal lanes that increases the number of signal lanes included in the second link to one of the a number of signal lanes corresponding to an allowable link width and the number of signal lanes that can be utilized by the device.

* * * * *